May 9, 1961    J. F. BERTSCH ET.AL    2,983,506
FLUID DISTRIBUTION SYSTEMS AND APPARATUS THEREFOR
Filed Sept. 26, 1957    3 Sheets-Sheet 1

INVENTORS
Joseph F. Bertsch, &
BY Kai H. Hansen
W. S. Pettigrew
ATTORNEY

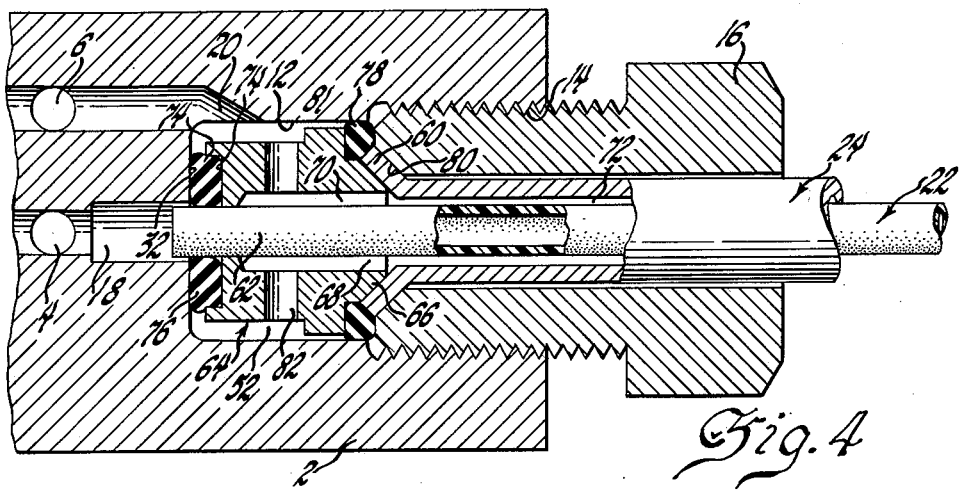
Fig. 4
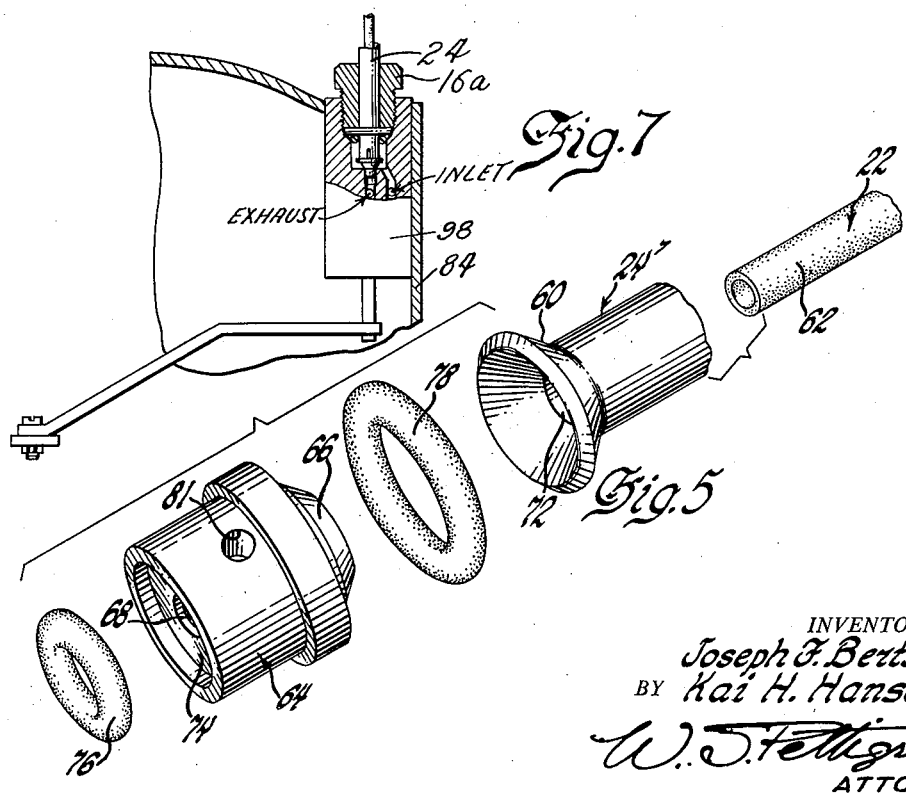
Fig. 7
Fig. 5
INVENTORS
Joseph F. Bertsch, &
BY Kai H. Hansen
ATTORNEY

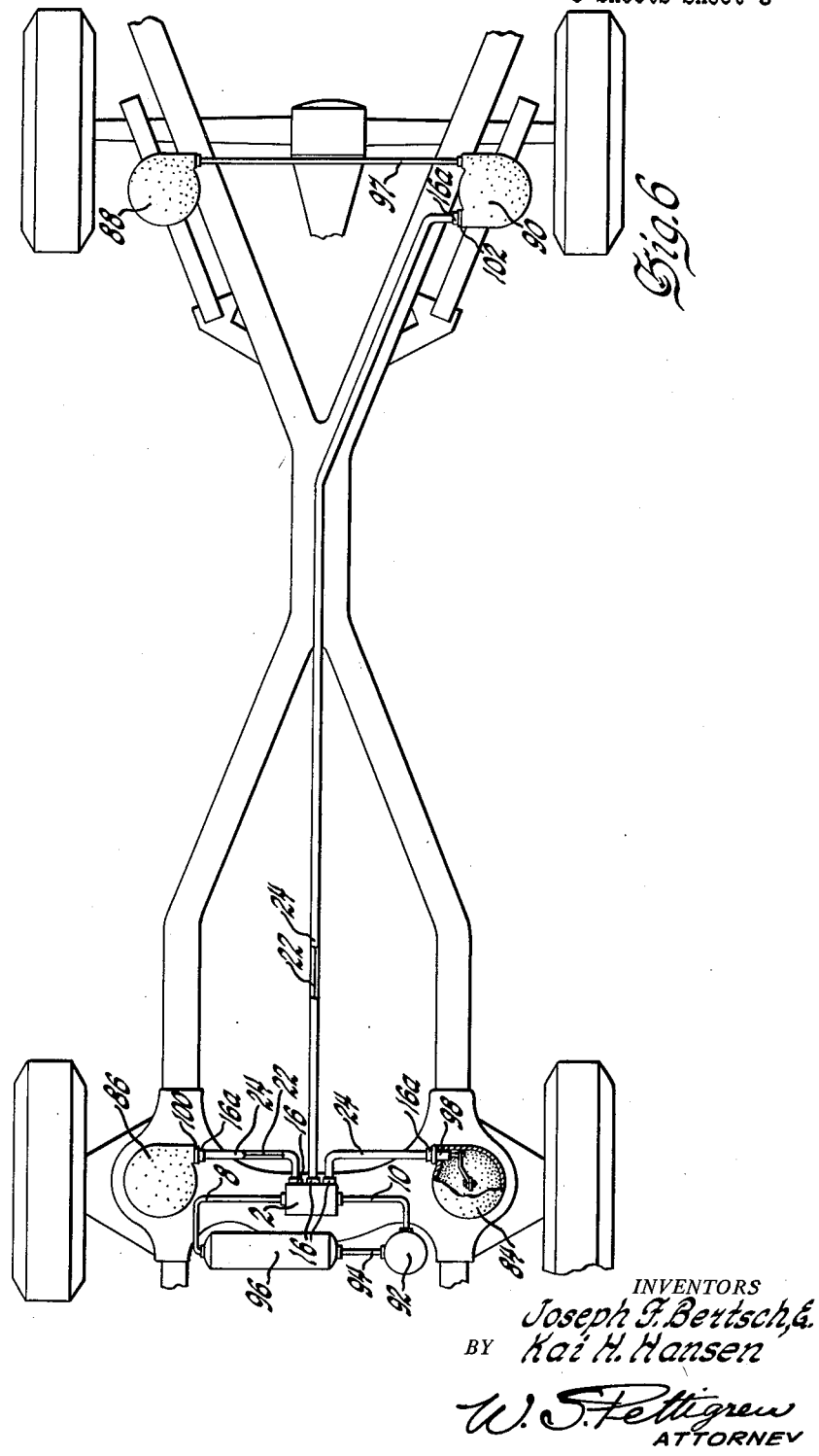

United States Patent Office 2,983,506
Patented May 9, 1961

2,983,506

FLUID DISTRIBUTION SYSTEMS AND APPARATUS THEREFOR

Joseph F. Bertsch and Kai H. Hansen, Detroit, Mich., assignors to General Motors Corporation, Detroit, Mich., a corporation of Delaware Filed Sept. 26, 1957, Ser. No. 686,490

9 Claims. (Cl. 267—65)

This invention relates to fluid distribution systems and apparatus therefor and more particularly, although not exclusively, to apparatus for use in conjunction with fluid suspension employing closed or semi-closed circuits.

As used herein, the terms closed and semi-closed circuits refer generally to arrangement wherein fluid from a source of pressure is conducted to one or a plurality of operating devices through separate conduits and ultimately returned from the operating devices to the source of pressure through other separate conduits. In the case of semi-closed systems, the return conduits are provided with venting apparatus allowing controlled discharge and make-up of fluid to accommodate occasional deviation from the normal pressure limitations of the return conduit. Except as noted, both systems involve continuous recirculation of the initial fluid charge in the system. Although the present invention is broadly applicable to any device employing either of the broad forms of systems defined, the description herein concerns the invention as related to vehicle air suspension systems. It will be understood, however, that the invention is in no sense limited exclusively to air suspension systems.

In prior art, systems of the type referred to commonly employed arrangements wherein the various supply and exhaust conduits are connected individually with such junctions, T's, operating devices and other fittings as are associated therewith. Such arrangements not only required individual connectors or couplings for each line, but also, in the case of more involved systems, presented serious space difficulties and installation problems due to the large number of fittings and extensive piping involved. In addition, in numerous applications such as air suspension, total exposure of pressure lines presents the serious additional hazard of system failure, due to corrosion, puncture, etc.

An object of the invention is to provide an improved fluid suspension system.

Another object is to provide an improved fluid distribution system.

Still another object is to provide an improved and simplified control apparatus for fluid suspension.

A further object is to provide a fluid supply and exhaust system wherein the supply and exhaust conduits are arranged one within the other.

Still a further object is to provide a distribution system having conduits arranged in the manner described wherein the supply line is disposed within the exhaust line so that the latter reduces the possibility of corrosive penetration or fracture of the former.

Yet another object is to provide pipe and fitting apparatus including a fluid supply pipe and fluid exhaust pipe which are disposed one within the other wherein the pipes are coupled to the fittings in a manner providing separate communicating relation with separate supply and exhaust cavities formed in the latter.

Still a further object is to provide apparatus of the stated character wherein connection and sealing of the respective pipes is accomplished by endwise separable parts.

Yet a further object is to provide pipe and fitting apparatus wherein the number of coupling members required is one-half the total number of conduits involved.

A still further object is to provide fluid distribution apparatus including supply lines and exhaust lines arranged so that the former is disposed within the latter, wherein the supply line is formed of a corrosion resistance readily flexible material which easily conforms to any irregular path or sharp angle defined by the outer exhaust conduit.

Still another object is to provide fluid distribution apparatus wherein the supply conduits are disposed within the exhaust conduit so that a superatmospheric pressure is normally exerted on the outer surface of the supply conduit.

These and other objects, advantages and features of the invention will become more fully apparent as reference is had to the accompanying specification and drawings wherein:

Fig. 4 illustrates in section a modified form of the invention shown in assembled relation;

Fig. 5 is an exploded perspective view of the piping and the parts associated therewith in the form of the invention shown in Fig. 4;

Fig. 6 is a schematic illustration of a pneumatic suspension system incorporating the invention; and Fig. 7 is a view, partly in section and with parts broken away, showing the assembled relation of the outer and inner pipes in a leveling valve of the type shown in Fig. 6.

Figure 2:
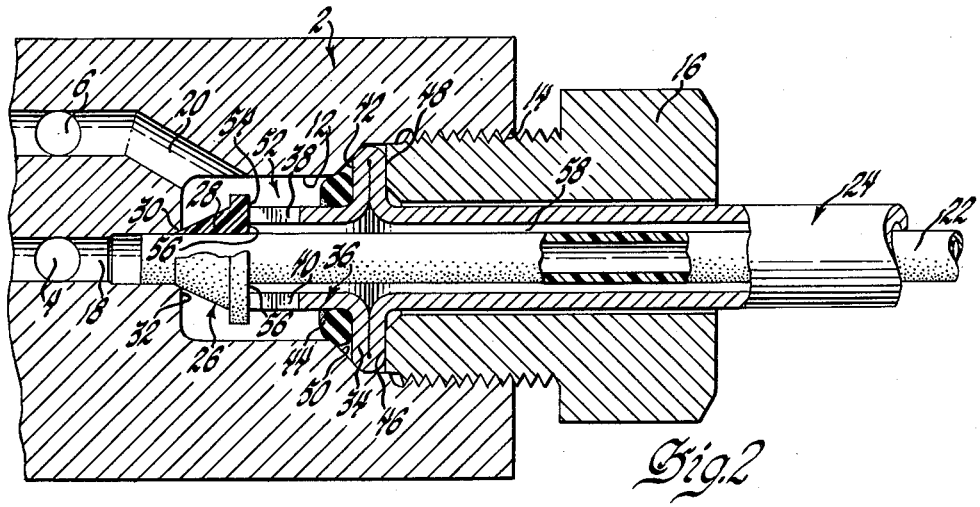
Fig. 2 is a view, partly in section and with parts broken away, showing the assembled relationship of the outer and inner pipes in a fitting of the type shown in Fig. 1.
Figure 3:
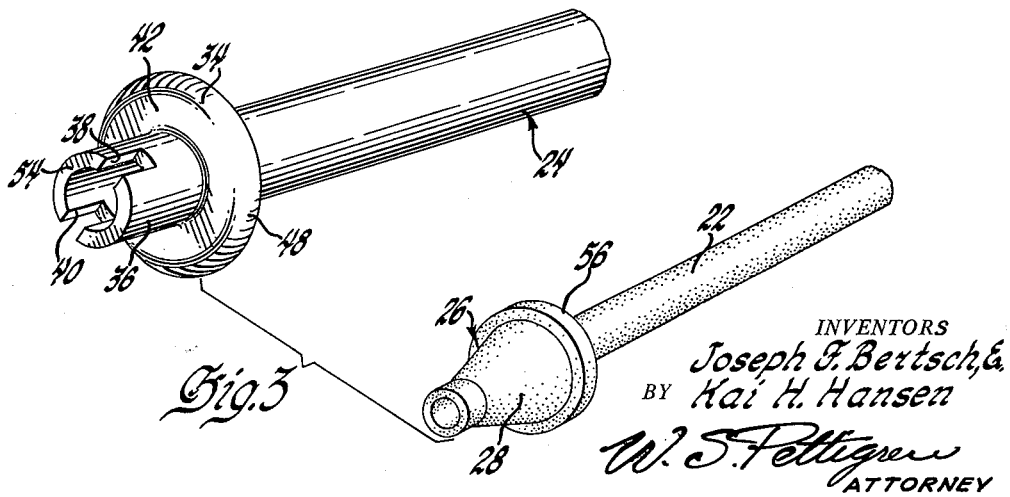
Fig. 3 illustrates in perspective the general configuration of the outer and inner pipes respectively.

Referring now to the drawings and particularly Figs. 2, 3 and 4, there is illustrated a fluid distribution fitting, which in the illustrated embodiment, takes the form of a junction block 2. Junction block 2 is provided with a pressure cavity 4 and an exhaust cavity 6 which communicate, respectively, with a source of fluid pressure and exhaust receiver via conduits 8 and 10. Extending into junction block 2 perpendicular to passages 4 and 6 are one or more ports 12 having an internally threaded counterbore 14 adapted to receive threaded pipe connectors 16. Port 12 communicates with cavities 4 and 6 respectively by means of drilled passages 18 and 20, the former of which is axially aligned with port 12.

In the arrangement shown, fluid is transmitted from passage 4 of junction block 2 to a flexible fluid supply conduit 22 and returned to exhaust passage 6 via an exhaust conduit 24 which surrounds supply conduit 22. To provide separate communicating relation between pipes 22 and 24 and cavities 4 and 6, respectively, in the embodiment illustrated in Fig. 3, pipe 22 extends some distance inwardly of the end of pipe 24 and has disposed therearound an endwise removable elastomeric ferrule 26 having a frusto-conical nose portion 28 adapted for abutting engagement with a frusto-conical seat 30 formed at the junction of passage 18 and the base 32 of port 12. Pipe 24, in turn, is upset to provide an intermediate radially outwardly extending flange portion 34 and terminates in a straight end portion 36 of the same diameter as the remaining length of the pipe. At its inner extremity, end portion 36 is provided with a pair of diametrically opposed slots 38 and 40, the purpose of which will be described shortly. Disposed around portion 36 adjacent the inner face 42 of flange 34 is an elastomeric seal or O-ring 44. When the parts are assembled in the relation shown in Fig. 3, progressive tightening of connector 16 causes the inner shoulder 46 thereof to engage the outer face 48 of flange 34 urging the latter into engagement with the inclined wall 50 of port 12, while simultaneously deforming O-ring 44 to perfect a fluid tight seal preventing leakage from the cavity 52 to atmosphere. At the same time, the flat end wall 54 of end portion 36 exerts axial pressure on the flat outer face 56 of ferrule 26, causing the tapered nose portion 28 thereof to effect a fluid tight seal between the inner peripheral wall of passage 18 and the outer peripheral wall of pipe 22. Inasmuch as passage 18 is axially aligned with pipe 22, direct communication between passage 18 and the interior of pipe 22 exists. Communication between pipe 24 and passage 20 is effected by the notches 38 and 40 formed in the end of pipe 24, previously mentioned. It will be apparent that fluid in the annular cavity 58 may be discharged laterally through notches 38 and 40 into the cavity 52 defined by port 12 and thence through diagonal passage 20 into exhaust cavity 6. It will now be seen that the present invention permits coupling of intake and exhaust lines, one within the other, with the addition of but a single relatively simple part not already required in conventional practice in coupling individual pipes. Yet as a result, for any given distribution system, the number of ports and threaded connectors required are reduced by one-half. It will, of course, be evident that the expense and time involved in performing the additional operations required in fabricating junction blocks and other fittings, i.e., forming of additional ports, threading operations and provision of additional threaded connections far exceeds the relatively slight cost involved in producing the ferrule 26, which may be molded from rubber, nylon, or numerous other plastic materials. It should also be noted that an arrangement according to the present invention permits extreme ease of assembly and disassembly, since the ferrule 26 is readily endwise removable from the pipe 22 when relieved of axial pressure thereon by the end wall 54 of pipe 24. Further, since pressure line is formed of flexible material, preferably nylon, it may readily be inserted and removed from line 24, even when the latter defines a highly irregular path.

Fig. 5 illustrates another embodiment of the invention wherein the exhaust conduit 24' terminates in a tapered outwardly flared end portion 60. Disposed axially adjacent tapered portion 60 and surrounding the inwardly extending end 62 of supply conduit 22 is an annular metal ferrule 64 having an outer tapered end 66. Ferrule 64 has an axial bore 68 extending partially therethrough which surrounds portion 62 to provide annular space 70 communicating with the annular space 72 formed between pipes 22 and 24'. Near the inner extremity of ferrule 64, axial bore 68 is reduced in diameter to effect surrounding engagement with end portion 62. Formed on the inner face of ferrule 64 is a circular relieved portion 74 in which is partially received an O-ring 76. O-ring 76 is so dimensioned that the inner diameter thereof tightly embraces the terminal end of pipe 22 to form a sphincter seal. Surrounding ferrule 64 near its outer end is a second O-ring 78 which is dimensioned so as to augment sealing of the abutting joint faces of flared portion 60, tapered outer end portion 66 and the tapered shoulder 80 of connector 16, as well as to prevent leakage from cavity 52 past the cooperating threads of connector 16 and port 12. Inasmuch as flared portion 60 of pipe 24 engages the tapered outer end 66 of ferrule 64, it will be evident that tightening of connector 16 will exert axial pressure on ferrule 64 causing sphincter seal 76 to be compressed between relieved portion 74 and the bottom wall 32 of port 12. As mentioned previously in connection with Fig. 3, pipe 22 is disposed in axial alignment with passage 18 and therefore effects direct communication therewith. As seen best in Fig. 4, communication between passage 20 and the annular space 72 between pipes 22 and 24 is effected by means of radial passages 81 and 82 drilled through the wall of ferrule 64 substantially midway thereof.

Figure 1:
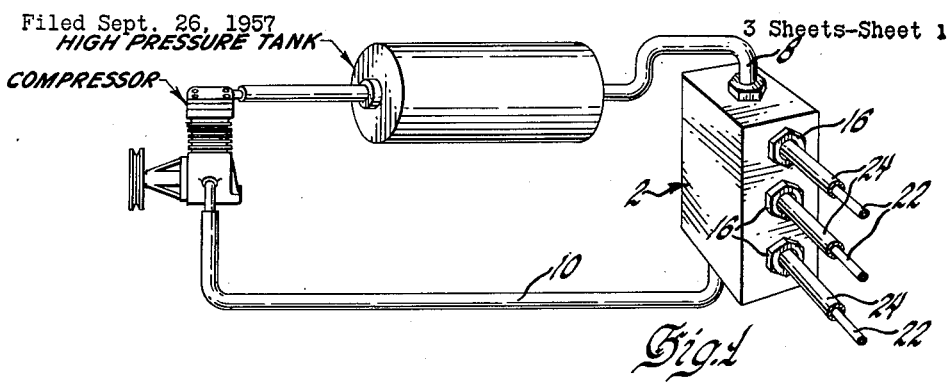
Fig. 1 is a perspective view of a fluid circuit incorporating a junction fitting and piping arrangement according to the invention.

Referring now to Fig. 6, there is illustrated schematically an air suspension system utilizing fluid distribution apparatus according to the present invention, which demonstrates graphically an arrangement involving a minimum number of pipe and fitting connections of the type described. Reference numerals 84, 86, 88 and 90 designate the usual individual air springs associated with the four wheels of the vehicle. An air compressor 92 provides a source of fluid pressure which is conducted through a conventional single conduit 94 to an accumulator or tank 96 which serves as a high pressure reservoir for the suspension system. Fluid from tank 96 is conducted to junction 2 through single supply conduit 8 into the high pressure cavity 4 of junction block 2. A single exhaust conduit 10, in turn, provides communication between exhaust cavity 6 of junction 2 and the intake side of compressor 92 to form a closed circuit fluid supply system. Springs 84, 86 and 90 are each provided with internally mounted leveling valve assemblies designated generally as 98, 100 and 102 which are adapted to control movement of air into and out of the springs in accordance with variation in vertical clearance between the sprung and unsprung mass of the vehicle. Inasmuch as the structure and operation of the leveling valves form no part of the present invention, further description thereof is omitted, it being understood that any conventional type may be utilized. For a complete description of an internal leveling valve of the type referred to, reference may be had to the copending application Serial No. 642,591, Joseph F. Bertsch et al., entitled Air Suspension Leveling Valve, assigned to General Motors Corporation. Leveling valves 98, 100 and 102 are individually connected to junction block 2 by one of the three dual lines 22-24 while supply and exhaust of air to spring 88 is accomplished by means of a single conduit 97 which provides open communication between spring 90 and 88. It will be understood that connection of the various dual lines 22-24 with the respective leveling valve is accomplished by means of pipe and fitting connections similar to those shown and described in connection with junction block 2 and that the leveling valves will be provided with internal supply and exhaust cavities corresponding to those formed in junction 2. Upon examination of Fig. 1, it will be evident that the system shown therein requires only six dual pipe and fitting connections, three of which (16) are located at junction block 2, while the other three (16a) are located individually at each of the leveling valve assemblies 98, 100 and 102. By way of comparison, any corresponding system involving separate intake and exhaust lines involve the use of twelve pipe and fitting connections. Hence, an air suspension system according to the present invention not only affords the functional advantages heretofore described, but also greatly reduces the number and complexity of parts involved and substantially decreases the time required for assembly, installation and repair.

In connection with the air suspension system described, it should be noted that the danger of fracture or corrosive penetration is largely limited to lines 24 and thus will not substantially impair normal operation of the system, since loss of air to atmosphere will occur only when air is exhausted from the springs. Inasmuch as the amount of air exhausted by the springs while the vehicle is in operation is relatively slight, the vehicle may safely be driven for long distances after damage to lines 24 occurs. By way of comparison, in a system where the supply line is exposed, any significant fraction will either totally disable the vehicle or impose excessive demands on the air compressor.

While but several embodiments of the invention have been shown and described, it will be evident that numerous modifications and changes may be made therein. It is, therefore, to be understood, that it is not intended to limit the invention to the embodiments shown, but only by the scope of the claims which follow:

The claims:
1. A fluid distribution network comprising a source of fluid pressure, a junction body having a pressure cavity and an exhaust cavity, a pressure line connected between said source and said pressure cavity, an exhaust line connected between said exhaust cavity and said source, an opening formed in said body having common communication with said pressure and exhaust cavities, a secondary pressure and secondary exhaust line arranged one within the other in annularly spaced relation and extending into said opening, and means for coupling said secondary lines in separate communicating relation with said exhaust and pressure cavities, respectively, said means including a normally endwise removable annular portion surrounding the inner of said lines.

2. A fluid distribution network comprising a source of fluid pressure, a junction body having a pressure cavity and an exhaust cavity, a pressure line connected between said source and said pressure cavity, an exhaust line connected between said exhaust cavity and said source, an opening formed in said body having common communication with said pressure and exhaust cavities, a secondary pressure and secondary exhaust line arranged in generally concentric relation and extending into said opening, and means for coupling said secondary lines in separate communicating relation with said exhaust and pressure cavities respectively, said means including a normally endwise removable annular portion surrounding the inner of said concentric lines, said annular portion having an outer diameter greater than the inner diameter of said outer line.

3. In combination, a fitting having an opening formed therein, an outer pipe having a flared end, an inner pipe of uniform cross section from end to end extending through said outer pipe, an annulus surrounding said inner pipe and abutting said flared end of said outer pipe, means forming a radially extending opening in said annulus, a seal compressed between the outer pipe and said annulus, a sphincter seal surrounding said inner pipe and compressed between said annulus and the bottom of said opening, and a collar surrounding said outer pipe, said collar being threaded into said opening to exert axial pressure on said outer pipe and annulus.

4. An air spring suspension system comprising, a junction having a pressure cavity and an exhaust cavity, a source of fluid pressure communicating with said pressure cavity, an exhaust receiver communicating with said exhaust cavity, a plurality of height-sensing control valves connected to and adapted to regulate the flow of fluid to and from the springs combined in the system, each of said control valves having an inlet passage and an exhaust passage, and means for conveying pressure fluid to and for conveying exhaust fluid from said control valves, said means including intake and exhaust lines arranged one within the other with the latter surrounding the former, the intake lines being formed of flexible non-corrosive material and the exhaust lines being formed of a material which is relatively rigid compared to the material of which the intake lines are formed.

5. The structure set forth in claim 1 wherein said endwise removable means comprises an annular member having a circular relieved portion at its inner end and a tapered portion at its outer end, an annular seal partially recessed in said relieved portion and tightly embracing said inner pipe, a second annular seal surrounding said annular member near the outer end thereof, said outer secondary line having a flared portion formed on the end thereof engaging said tapered portion and said second annular seal, and threadable means axially engaging said flared portion to simultaneously cause said first mentioned seal to be compressed between said annular member and the base of said opening and said second annular seal to be expanded into tight engagement with the peripheral wall of said opening.

6. The structure set forth in claim 1 wherein common communication between said opening and said pressure and exhaust cavities is provided by a pair of internal passages, one of which has a flared mouth substantially axially aligned with said opening with the end portion of the inner of said secondary lines extending beyond the flared mouth of said internal passage, and the means for coupling said lines in separate communicating relation comprises a resilient annular body slidably disposed on and surroundingly engaging the portion of said inner secondary line between said flared mouth and the end of said outer secondary line, the end of said outer secondary line being substantially flat and abutting said resilient body, an annular flange on said outer secondary line near the end thereof, means engageable with said junction body axially urging said annular flange into fluid tight engagement with said opening, said flange and said end portion of said outer secondary line being axially spaced so that said resilient body is simultaneously compressed by said end portion to effect fluid tight engagement between said flared mouth and said inner secondary line, and means forming an opening in the wall of said outer secondary line near the end thereof.

7. The structure set forth in claim 6 wherein said resilient annular body is generally tapered in cross section and provided with a substantially flat outer end wall engageable with the flat end portion of said outer pipe.

8. The structure set forth in claim 6 wherein the opening formed in the wall of said outer pipe comprises at least one notch in the end of said pipe.

9. In a device of the class described, an outer pipe of substantially uniform inner diameter from end to end, an intermediate radially outwardly extending annular flange formed on said pipe, a flexible straight walled pipe of substantially uniform outer diameter from end to end disposed within said outer pipe and having its inner ends extending beyond the inner end of the former, a flexible ferrule of generally frusto-conical external configuration slidably disposed on and surroundingly embracing the end of said flexible pipe, and means forming at least one radially directed opening in the wall of said outer pipe between said flange and the base of said ferrule.

References Cited in the file of this patent
UNITED STATES PATENTS

| | | |
|---|---|---|
| 2,410,912 | Wenk | Nov. 12, 1946 |
| 2,519,939 | Smith | Aug. 22, 1950 |
| 2,611,607 | Needy | Sept. 23, 1952 |
| 2,644,699 | Weiertz | July 7, 1953 |
| 2,733,931 | Reid et al. | Feb. 7, 1956 |
| 2,812,954 | Lyon | Nov. 12, 1957 |